(12) United States Patent (10) Patent No.: US 11,997,510 B2
Sekar et al. (45) Date of Patent: May 28, 2024

(54) WIRELESS COMMUNICATION NETWORK ACCESS USING DIFFERENT FUNCTIONALITY SPLITS FOR DIFFERENT COMMUNICATION SERVICES

(71) Applicant: T-MOBILE INNOVATIONS LLC, Overland Park, KS (US)

(72) Inventors: Muthukumaraswamy Sekar, Brambleton, VA (US); Sathyanarayanan Raghunathan, Herndon, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 652 days.

(21) Appl. No.: 17/063,490

(22) Filed: Oct. 5, 2020

(65) Prior Publication Data

US 2021/0044989 A1 Feb. 11, 2021

Related U.S. Application Data

(63) Continuation of application No. 16/532,111, filed on Aug. 5, 2019, now Pat. No. 10,834,618.

(51) Int. Cl.
*H04W 24/02* (2009.01)
(52) U.S. Cl.
CPC .................. *H04W 24/02* (2013.01)
(58) Field of Classification Search
None
See application file for complete search history.

(56) References Cited

U.S. PATENT DOCUMENTS

| 10,531,336 | B2 * | 1/2020 | Goldhamer | H04L 1/0026 |
| 10,531,351 | B2 * | 1/2020 | Li | H04L 41/0896 |
| 10,834,618 | B1 * | 11/2020 | Sekar | H04W 24/02 |
| 11,696,348 | B2 * | 7/2023 | Sivavakeesar | H04W 76/10 |
| | | | | 370/328 |
| 2006/0058038 | A1 | 3/2006 | Das et al. | |
| 2006/0075217 | A1 | 4/2006 | Takamoto et al. | |
| 2007/0191054 | A1 | 8/2007 | Das et al. | |
| 2008/0069088 | A1 | 3/2008 | Petrovic et al. | |
| 2015/0009826 | A1 | 1/2015 | Ma et al. | |

(Continued)

FOREIGN PATENT DOCUMENTS

| EP | 3451787 A1 * | 3/2019 | ............. H04L 69/08 |
| WO | 2018175817 A1 | 9/2018 | |

(Continued)

*Primary Examiner* — Edan Orgad
*Assistant Examiner* — Emmanuel K Maglo

(57) ABSTRACT

A wireless network controller selects a network slice for a User Equipment (UE). The wireless network controller selects a functionality split for the UE based on the selected network slice and indicates the selected functionality split to a Centralized Unit (CU). The CU indicates the selected functionality split to a Distributed Unit (DU). The DU exchanges user communications with the UE. The DU processes the user communications with the network applications allocated to the DU in the selected functionality split for the UE. The DU exchanges the user communications with the CU. The CU processes the user communications with the network applications allocated to the CU in the selected functionality split for the UE.

20 Claims, 8 Drawing Sheets

(56) References Cited

U.S. PATENT DOCUMENTS

| | | | |
|---|---|---|---|
| 2016/0183248 A1* | 6/2016 | Niu | H04B 7/0413 |
| | | | 370/329 |
| 2016/0234847 A1 | 8/2016 | Zhang et al. | |
| 2016/0359750 A1 | 12/2016 | Miklos et al. | |
| 2017/0086049 A1* | 3/2017 | Vrzic | H04W 36/18 |
| 2017/0208516 A1* | 7/2017 | Kubota | H04W 36/30 |
| 2017/0257183 A1* | 9/2017 | Vikberg | H04L 1/0001 |
| 2017/0289270 A1 | 10/2017 | Li et al. | |
| 2017/0359749 A1 | 12/2017 | Dao | |
| 2018/0035399 A1 | 2/2018 | Xu et al. | |
| 2018/0097678 A1 | 4/2018 | Zhou et al. | |
| 2018/0124798 A1* | 5/2018 | Ramamurthi | H04L 1/1893 |
| 2018/0124859 A1 | 5/2018 | Cho et al. | |
| 2018/0206258 A1 | 7/2018 | Hosseini et al. | |
| 2018/0249375 A1* | 8/2018 | Goldhamer | H04W 36/22 |
| 2018/0262912 A1 | 9/2018 | Goldhamer | |
| 2018/0270791 A1* | 9/2018 | Park | H04W 8/24 |
| 2018/0324663 A1* | 11/2018 | Park | H04W 36/22 |
| 2018/0368205 A1* | 12/2018 | Park | H04W 76/30 |
| 2018/0376380 A1* | 12/2018 | Leroux | H04W 76/27 |
| 2019/0058997 A1* | 2/2019 | Futaki | H04W 36/26 |
| 2019/0069325 A1 | 2/2019 | Yerramalli et al. | |
| 2019/0075438 A1 | 3/2019 | Kuo et al. | |
| 2019/0098536 A1* | 3/2019 | Qiao | H04W 36/32 |
| 2019/0124508 A1* | 4/2019 | Watfa | H04L 63/0876 |
| 2019/0124572 A1* | 4/2019 | Park | H04W 36/08 |
| 2019/0158371 A1 | 5/2019 | Dillon et al. | |
| 2019/0174561 A1* | 6/2019 | Sivavakeesar | H04W 48/12 |
| 2019/0182737 A1* | 6/2019 | Futaki | H04W 24/10 |
| 2019/0182800 A1* | 6/2019 | Park | H04W 76/27 |
| 2019/0200264 A1* | 6/2019 | Kim | H04W 60/04 |
| 2019/0200285 A1* | 6/2019 | Velev | H04W 8/02 |
| 2019/0208575 A1 | 7/2019 | Barbieri et al. | |
| 2019/0261185 A1* | 8/2019 | Velev | H04W 48/18 |
| 2019/0268633 A1* | 8/2019 | Jayawardene | H04N 21/23103 |
| 2019/0319765 A1 | 10/2019 | El Mghazli et al. | |
| 2019/0320494 A1* | 10/2019 | Jayawardene | H04L 5/0041 |
| 2019/0335388 A1 | 10/2019 | Bulakci et al. | |
| 2019/0387561 A1* | 12/2019 | Paladugu | H04W 76/15 |
| 2020/0100137 A1* | 3/2020 | Panchal | H04W 48/18 |
| 2020/0267803 A1* | 8/2020 | Kwak | H04L 5/0007 |
| 2020/0351930 A1* | 11/2020 | Luo | H04W 24/08 |
| 2021/0352531 A1* | 11/2021 | Vesely | H04W 76/19 |

FOREIGN PATENT DOCUMENTS

| | | | | |
|---|---|---|---|---|
| WO | 2019046572 A1 | 3/2019 | | |
| WO | WO-2019051231 A1 * | 3/2019 | | H04B 7/0617 |

* cited by examiner

WIRELESS COMMUNICATION NETWORK ACCESS USING DIFFERENT FUNCTIONALITY SPLITS FOR DIFFERENT COMMUNICATION SERVICES

RELATED CASES

This United States patent application is a continuation of U.S. patent application Ser. No. 16/532,111 that was filed on Aug. 5, 2019 and is entitled "WIRELESS COMMUNICATION NETWORK ACCESS USING DIFFERENT FUNCTIONALITY SPLITS FOR DIFFERENT COMMUNICATION SERVICES." U.S. patent application Ser. No. 16/532,111 is hereby incorporated by reference into this United States patent application.

TECHNICAL BACKGROUND

Wireless communication networks provide wireless data services to wireless user devices. Exemplary wireless data services include voice-calling, internet-access, and machine communications. Exemplary wireless user devices comprise phones, computers, vehicles, and robots. The wireless communication networks have wireless access nodes that exchange wireless signals with the wireless user devices to facilitate the data services. The wireless signals transport user data.

The wireless access nodes comprise radio circuitry like antennas, modulators, amplifiers, and filters. The antennas are wirelessly linked to the wireless user devices. The wireless access nodes also have baseband circuitry like Digital Signal Processors (DSPs), Central Processing Units (CPUs), and memory. The baseband circuitry executes network applications. that handle the user data in between the radio circuitry and the wireless communication network. Exemplary network applications include Physical Layer (PHY), Media Access Control (MAC), Radio Link Control (RLC), Packet Data Convergence Protocol (PDCP), Radio Resource Control (RRC), and Service Data Adaptation Protocol (SDAP).

Some newer wireless access nodes comprise a Distributed Unit (DU) and a Centralized Unit (CU). The DU includes the radio circuitry and is typically mounted on a tower or some other elevated structure. The CU includes the baseband circuitry and is typically located in a data center at the network edge. In some cases, the DU also executes some of the network applications. For example, the DU may execute the PHY, MAC, and RLC while the CU executes the PDCP, RRC, and SDAP. The term "functionality split" refers to this split in the network applications between the DU and the CU.

There are several possible functionality splits between the DU and CU. A functionality split that is DU-heavy and CU-light generally has low-latency at the expense of powerful computing. A functionality split that is CU-heavy and DU-light generally has powerful computing processing at the expense of low-latency. Unfortunately, the use of functionality splits in wireless access points remains rigid and unintelligent.

TECHNICAL OVERVIEW

A wireless network controller selects a network slice for a User Equipment (UE). The wireless network controller selects a functionality split for the UE based on the selected network slice and indicates the selected functionality split to a Centralized Unit (CU). The CU indicates the selected functionality split to a Distributed Unit (DU). The DU exchanges user communications with the UE. The DU processes the user communications with the network applications allocated to the DU in the selected functionality split for the UE. The DU exchanges the user communications with the CU. The CU processes the user communications with the network applications allocated to the CU in the selected functionality split for the UE.

DETAILED DESCRIPTION

Figure 1:
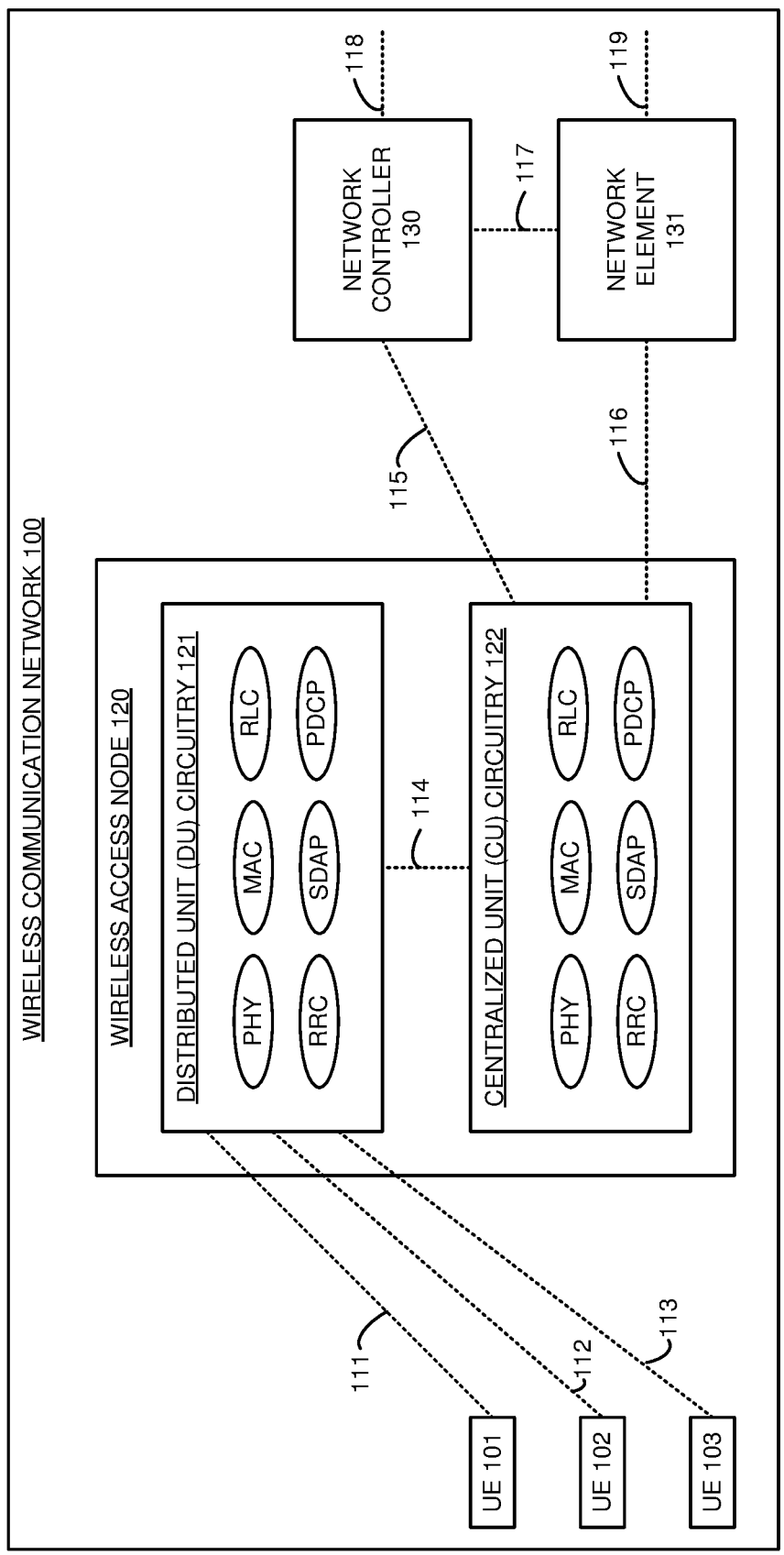
FIG. 1 illustrates a wireless communication network to serve wireless User Equipment (UEs) with different data communication services using different functionality splits.

FIG. 1 illustrates wireless communication network 100 to serve wireless User Equipment (UEs) 101-103 with different data communication services using different functionality splits. Wireless communication network 100 comprises UEs 101-103, wireless access node 120, network controller 130, and network element 131. UEs 101-103 comprise vehicles, drones, phones, computers, robots, sensors, or some other user apparatus with communication circuitry. The data communication services comprise machine communications, vehicle control, media-streaming, social-networking, and/or some other user applications. FIG. 1 has been restricted for clarity and wireless communication network 100 comprises many more UEs and wireless access points than the amount shown.

Wireless access node 120 stores and executes network applications that comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used. Wireless access node 120 executes the network applications in sequence on the uplink—PHY, MAC, RLC, PDCP, and RRC/SDAP. Wireless access node 120 executes the network applications in the reverse sequence on the downlink—RRC/SDAP, PDCP, RLC, MAC, and PHY.

Wireless access node 120 comprises Distributed Unit (DU) circuitry 121 and Centralized Unit (CU) circuitry 122 which are coupled over data link 114. The functionality split specifies which of the network applications (PHY, MAC, RLC, PDCP, RRC/SDAP) are executed by DU circuitry 121 and which of the network applications are executed by CU circuitry 122. For example, UE 101 may use a functionality split where DU circuitry 121 executes the PHY, MAC, and RLC while CU circuitry 122 executes the PDCP and RRC/SDAP. UE 102 may use a functionality split where DU circuitry 121 executes the PHY while CU circuitry 122 executes the MAC, RLC, PDCP, and RRC/SDAP. Network controller 130 selects individual functionality splits for UEs 101-103 based on their individual service requests. In particular, network controller 130 selects individual functionality splits for UEs 101-103 based on their individual wireless data service, Quality-of-Service (QoS) level, Public Land Mobile Network (PLMN), wireless network slice, UE-selected functionality split, or some other information element that is indicated in the service request.

DU circuitry 121 comprises antennas, modulators, amplifiers, filters, digital/analog interfaces, microprocessors, memory, software, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memories comprise Random Access Memory (RAM), flash circuitry, disk drives, and/or the like. The DU memory stores software like operating systems and network applications. The microprocessors execute the operating systems and network applications to wirelessly exchange network signaling and user data with UEs 101-103 over wireless links 111-113. The microprocessors execute the operating systems and network applications to exchange network signaling and user data with CU circuitry 122 over data link 114.

CU circuitry 122 comprises microprocessors, memory, software, and bus connections. The microprocessors comprise CPUs, GPUs, ASICs, and/or the like. The memories comprise RAM, flash circuitry, disk drives, and/or the like. In CU circuitry 122, the memory stores software like operating systems, virtual components, and network applications. The microprocessors execute the operating systems, virtual components, and network applications to wirelessly exchange the network signaling and user data with DU circuitry over data link 114. The microprocessors execute the operating systems, virtual components, and network applications to exchange network signaling with network controller 130 over data link 115 and to exchange the user data with network element 131 over data link 116.

UEs 101-103 and DU circuitry 121 are coupled over respective wireless links 111-113. Wireless links 111-113 use frequencies in the low-band, mid-band, millimeter band, and/or some other part of the wireless spectrum. CU circuitry 122 is coupled to network controller over data link 115 and to network element 131 over data link 116. Network controller 130 is coupled to network element 131 over data link 117. Network controller 130 and network element 131 are coupled to external systems over respective data links 118-119. Links 111-119 may comprise intermediate communication nodes and networks.

Network controller 130 comprises a Fifth Generation Core (5GC) Session Management Function (SMF), 5GC Access and Mobility Management Function (AMF), 5GC Policy Control Function (PCF), network application in circuitry 121-122, Software-Defined Network (SDN) controller, SDN application, Mobility Management Entity (MME), or some other control-plane network element. Network element 131 comprises a Fifth Generation Core (5GC) User Plane Function (UPF), SDN data machine, Serving Gateway (SGW), Packet Data Network Gateway (P-GW), or some other data-plane network element. In some examples, some of all of network controller 130 could be integrated within wireless access point 120.

UE 101 transfers a service request for one of the data communication services to DU circuitry 121. DU circuitry 121 wirelessly receives the service request from UE 101 and transfers the service request to CU circuitry 122. CU circuitry 122 receives the service request for UE 101 and transfers the service request to network controller 130. Network controller 130 receives the service request for UE 101 and responsively selects one of the different functionality splits for UE 101 based on the service request. For example, the service request may indicate a Quality-of-Service (QoS) level like Ultra Low Latency (ULL), and network controller 130 may select functionality split one (the DU executes the PHY, MAC, RLC, and PDCP, while the CU executes the RRC/SDAP. Network controller 130 transfers a service response for UE 101 indicating the selected one of the different functionality splits for UE 101 to CU circuitry 122. CU circuitry 122 receives the service response for UE 101 and transfers the service response to DU circuitry 121. DU circuitry 121 receives the service response for UE 101. DU circuitry 121 wirelessly exchanges user communications with UE 101. DU circuitry 121 processes the user communications with a set of the PHY, MAC, RLC, PDCP, RRC, and SDAP based on the functionality split indicated in the service response. DU circuitry 121 exchanges the user communications with CU circuitry 122. CU circuitry 122 processes the user communications with a set of the PHY, MAC, RLC, PDCP, RRC, and SDAP based on the functionality split indicated in the service response. For example, DU circuitry 121 may process the user communications with the PHY, MAC, RLC, and PDCP while CU circuitry 122 processes the user communications with the RRC/SDAP. CU circuitry 122 exchanges the user communications with network element 131.

UE 102 transfers a service request for one of the data communication services to DU circuitry 121. DU circuitry 121 wirelessly receives the service request from UE 102 and transfers the service request to CU circuitry 122. CU circuitry 122 receives the service request for UE 102 and transfers the service request to network controller 130. Network controller 130 receives the service request for UE 102 and responsively selects one of the different functionality splits for UE 102 based on the service request. For example, the service request may indicate a Public Land Mobile Network (PLMN) that delivers mobile video, and network controller 130 may select functionality split eight (the DU executes the PHY, while the CU executes the MAC, RLC, PDCP, and RRC/SDAP). Network controller 130 transfers a service response for UE 102 indicating the selected one of the different functionality splits to CU circuitry 122. CU circuitry 122 receives the service response for UE 102 and transfers the service response to DU circuitry 121. DU circuitry 121 receives the service response for UE 102. DU circuitry 121 wirelessly exchanges user communications with UE 102. DU circuitry 121 processes the user communications with a set of the PHY, MAC, RLC, PDCP, RRC, and SDAP based on the functionality split indicated in the service response. DU circuitry 121 exchanges the user communications with CU circuitry 122. CU circuitry 122 processes the user communications with a set of the PHY, MAC, RLC, PDCP, RRC, and SDAP based on the functionality split indicated in the service response. For example, DU circuitry 121 may process the user communications with the PHY while CU circuitry 122 processes the user communications with the MAC, RLC, PDCP, and RRC, /SDAP. CU circuitry 122 exchanges the user communications with network element 131.

UE 103 transfers a service request for one of the data communication services to DU circuitry 121. DU circuitry 121 wirelessly receives the service request from UE 103 and transfers the service request to CU circuitry 122. CU circuitry 122 receives the service request for UE 103 and transfers the service request to network controller 130. Network controller 130 receives the service request for UE 103 and responsively selects one of the different functionality splits based on the service request. For example, the service request may indicate wireless network slice for internet-access, and network controller 130 may select functionality split three (the DU executes the PHY, MAC, and RLC while the CU executes the PDCP and RRC/SDAP. Network controller 130 transfers a service response for UE 103 indicating the selected one of the different functionality splits to CU circuitry 122. CU circuitry 122 receives the service response for UE 103 and transfers the service response to DU circuitry 121. DU circuitry 121 receives the service response for UE 103. DU circuitry 121 wirelessly exchanges user communications with UE 103. DU circuitry 121 processes the user communications with a set of the PHY, MAC, RLC, PDCP, RRC, and SDAP based on the functionality split indicated in the service response. DU circuitry 121 exchanges the user communications with CU circuitry 122. CU circuitry 122 processes the user communications with a set of the PHY, MAC, RLC, PDCP, RRC, and SDAP based on the functionality split indicated in the service response. For example, DU circuitry 121 may process the user communications with the PHY, MAC, and RLC while CU circuitry 122 processes the user communications with the PDCP and RRC/SDAP. CU circuitry 122 exchanges the user communications with network element 131.

In some examples, different functionality splits are used on the uplink and downlink for the same UE at the same time. Network controller 130 may select one functionality split for the uplink and another functionality split for the downlink based on the service request. For example, network controller 130 may select functionality split one for the uplink (the DU executes the PHY, MAC, RLC, and PDCP while the CU executes the RRC/SDAP) and select functionality split eight for the downlink (the DU executes the PHY while the CU executes the MAC, RLC, PDCP, and RRC/SDAP). Network controller 130 transfers a service response for UE 103 indicating the uplink/downlink functionality splits to CU circuitry 122, and CU circuitry 122 transfers the service response to DU circuitry 121. DU circuitry 121 processes the user communications with sets of the PHY, MAC, RLC, PDCP, and RRC/SDAP based on the uplink/downlink functionality splits indicated in the service response. CU circuitry 122 processes the user communications with sets of the PHY, MAC, RLC, PDCP, and RRC/SDAP based on the uplink/downlink functionality splits indicated in the service response. For clarity, the different uplink/downlink functionality splits for the same UE at the same time are referred to herein in the singular as a functionality split.

In some examples, different functionality splits are assigned to different portions of the radio channel used by wireless links 111-113. For example, a 100 megahertz wide channel may be separated into eight parts where functionality splits 1-8 are assigned to respective channel parts 1-8. Thus, UEs 101-103 and wireless access node 120 would use the specific part of the frequency channel that is assigned to their individually selected functionality split. If functionality split 3 is selected for UE 101, then UE 101 and wireless access node 120 would use the third part of the frequency channel for wireless link 101. If functionality split 7 is selected for UE 103, then UE 103 and wireless access node 120 would use the seventh part of the frequency channel for wireless link 103.

Figure 2:
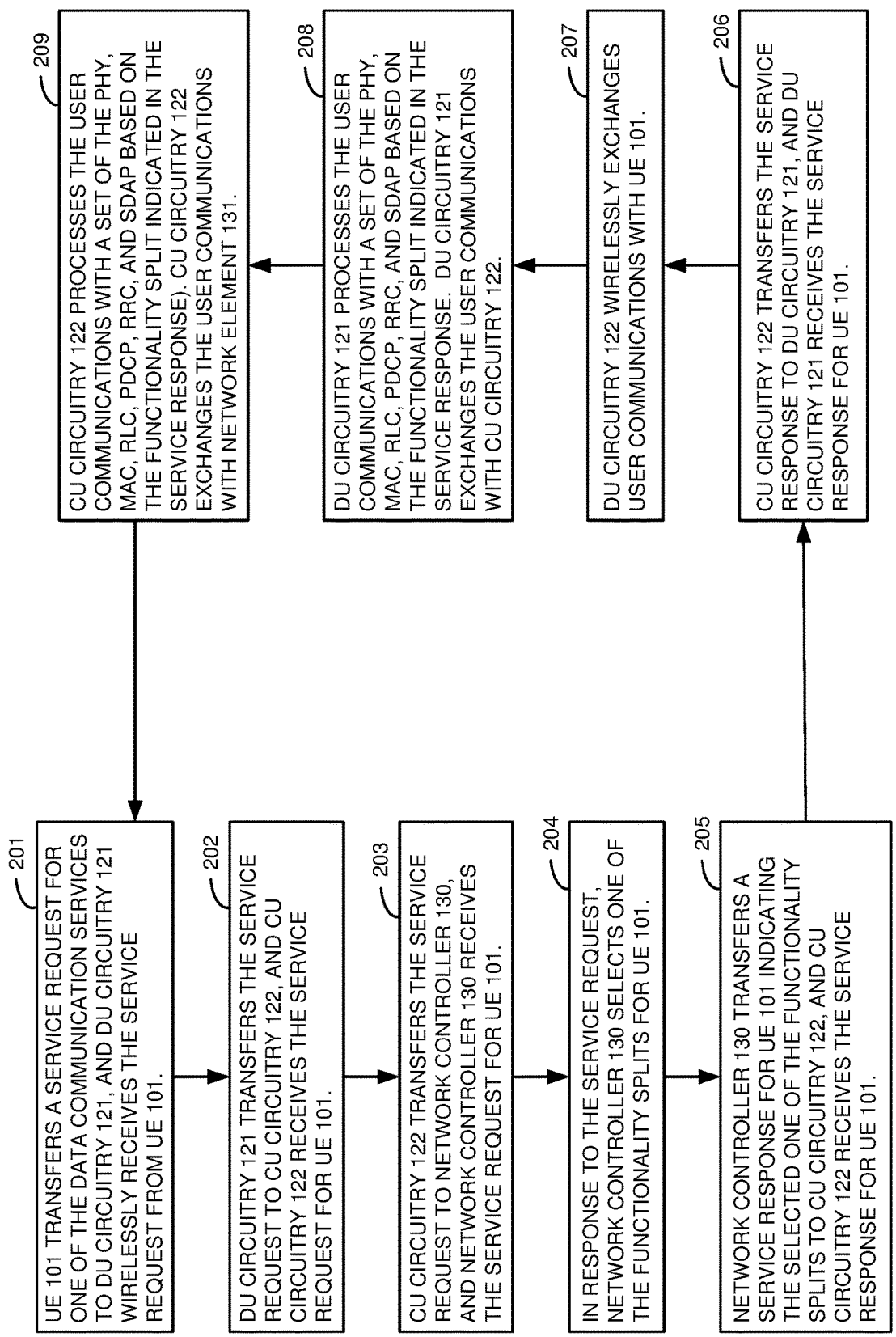
FIG. 2 illustrates the operation of the wireless communication network to serve the wireless UE with the different data communication services using the different functionality splits.

FIG. 2 illustrates the operation of wireless communication network 100 to serve wireless UE 101 with the different data communication services using the different functionality splits. UE 101 transfers a service request for one of the data communication services to DU circuitry 121, and DU circuitry 121 wirelessly receives the service request from UE 101 (201). DU circuitry 121 transfers the service request to CU circuitry 122, and CU circuitry 122 receives the service request for UE 101 (202). CU circuitry 122 transfers the service request to network controller 130, and network controller 130 receives the service request for UE 101 (203). In response to the service request, network controller 130 selects one of the functionality splits for UE 101 (204). Network controller 130 transfers a service response for UE 101 indicating the selected one of the functionality splits to CU circuitry 122, and CU circuitry 122 receives the service response for UE 101 (205). CU circuitry 122 transfers the service response to DU circuitry 121, and DU circuitry 121 receives the service response for UE 101 (206).

DU circuitry 122 wirelessly exchanges user communications with UE 102 (207). DU circuitry 121 processes the user communications with a set of the PHY, MAC, RLC, PDCP, RRC, and SDAP based on the functionality split indicated in the service response (208). DU circuitry 121 exchanges the user communications with CU circuitry 122 (208). CU circuitry 122 processes the user communications with a set of the PHY, MAC, RLC, PDCP, RRC, and SDAP based on the functionality split indicated in the service response (209). CU circuitry 122 exchanges the user communications with network element 131 (209). The operation repeats with a new service request (201).

Figure 3:
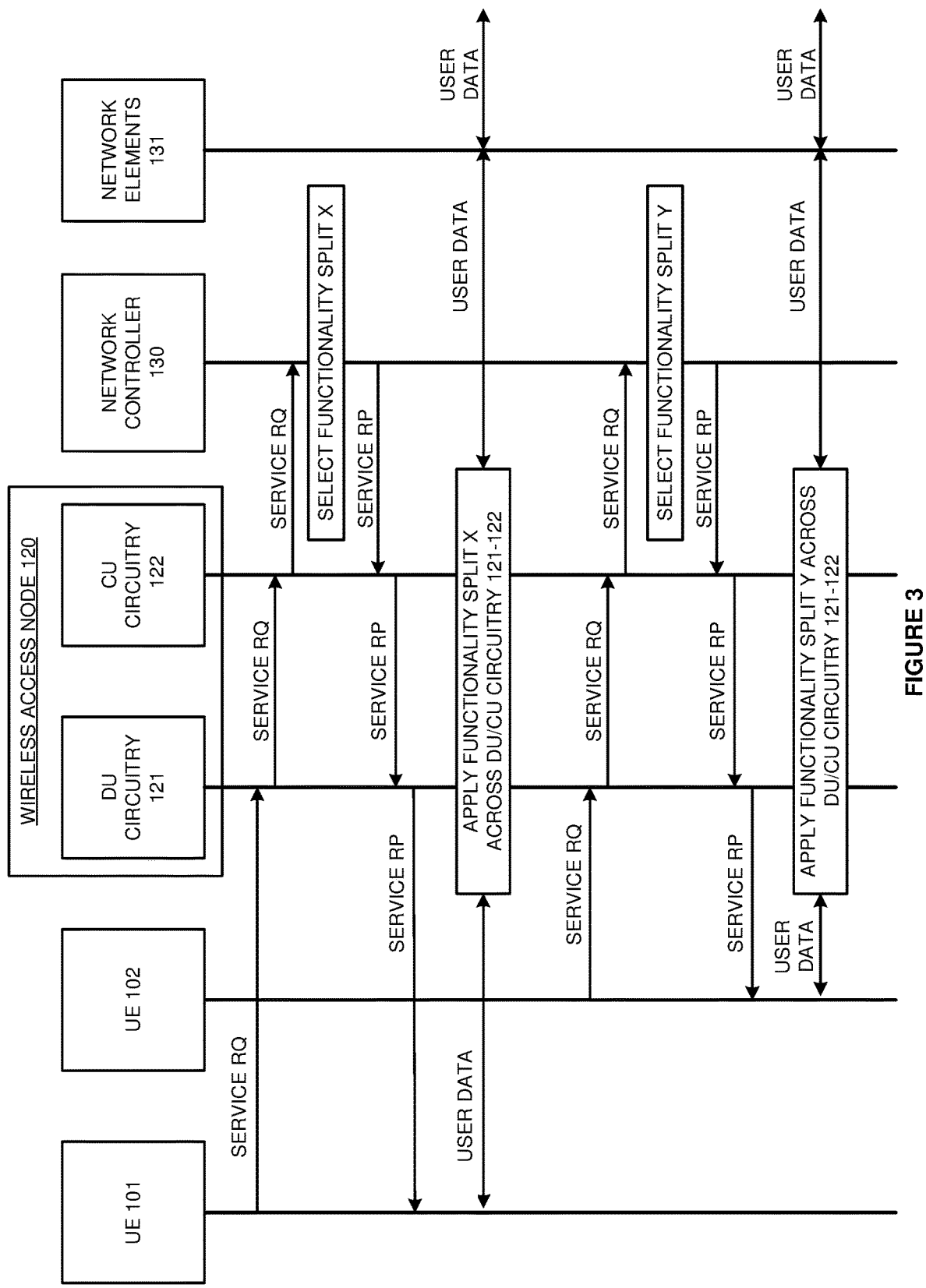
FIG. 3 illustrates the operation of the wireless communication network to serve the wireless UE with the different data communication services using the different functionality splits.

FIG. 3 illustrates the operation of wireless communication network 100 to serve wireless UEs 101-102 with the different data communication services using different functionality splits. UE 101 transfers a service request for a low-latency data communication service to DU circuitry 121. The service request indicates a UE-selected functionality split "X". DU circuitry 121 transfers the service request to CU circuitry 122. CU circuitry 122 transfers the service request to network controller 130. Network controller 130 selects functionality split X for UE 101 based on the UE-selection of functionality split X in the service request. Network controller 130 transfers a service response (RP) for UE 101 indicating the functionality split X to CU circuitry 122. CU circuitry 122 transfers the service response to DU circuitry 121. DU circuitry 121 wirelessly exchanges user data with UE 101. DU circuitry 121 processes the user data with the DU sets of network applications for functionality split X (for example—PHY, MAC, RLC on the uplink and PHY, MAC on the downlink). DU circuitry 121 exchanges the user data with CU circuitry 122. CU circuitry 122 processes the user data with the CU sets of network applications for functionality split X (for example—PDCP and RRC/SDAP on the uplink and RLC, PDCP, RRC/SDAP on the downlink). CU circuitry 122 exchanges the user data with network element 131 which exchanges the user data with external systems.

UE 102 transfers a service request for a data communication service to DU circuitry 121. The service request indicates the data communication service—mobile video. DU circuitry 121 transfers the service request to CU circuitry 122. CU circuitry 122 transfers the service request to network controller 130. Network controller 130 selects functionality split Y for UE 102 based on the mobile video service in the service request. Network controller 130 transfers a service response for UE 102 indicating the functionality split Y to CU circuitry 122. CU circuitry 122 transfers the service response to DU circuitry 121. DU circuitry 121 wirelessly exchanges user data with UE 102. DU circuitry 121 processes the user data with the DU set of network applications for functionality split Y (for example—PHY). DU circuitry 121 exchanges the user data with CU circuitry 122. CU circuitry 122 processes the user data with the CU set of network applications for functionality split Y (for example—MAC, RLC, PDCP, and RRC/SDAP). CU circuitry 122 exchanges the user data with network element 131 which exchanges the user data with external systems.

Advantageously, wireless communication network 100 and wireless access node 120 use functionality splits in a flexible and intelligent manner.

Figure 4:
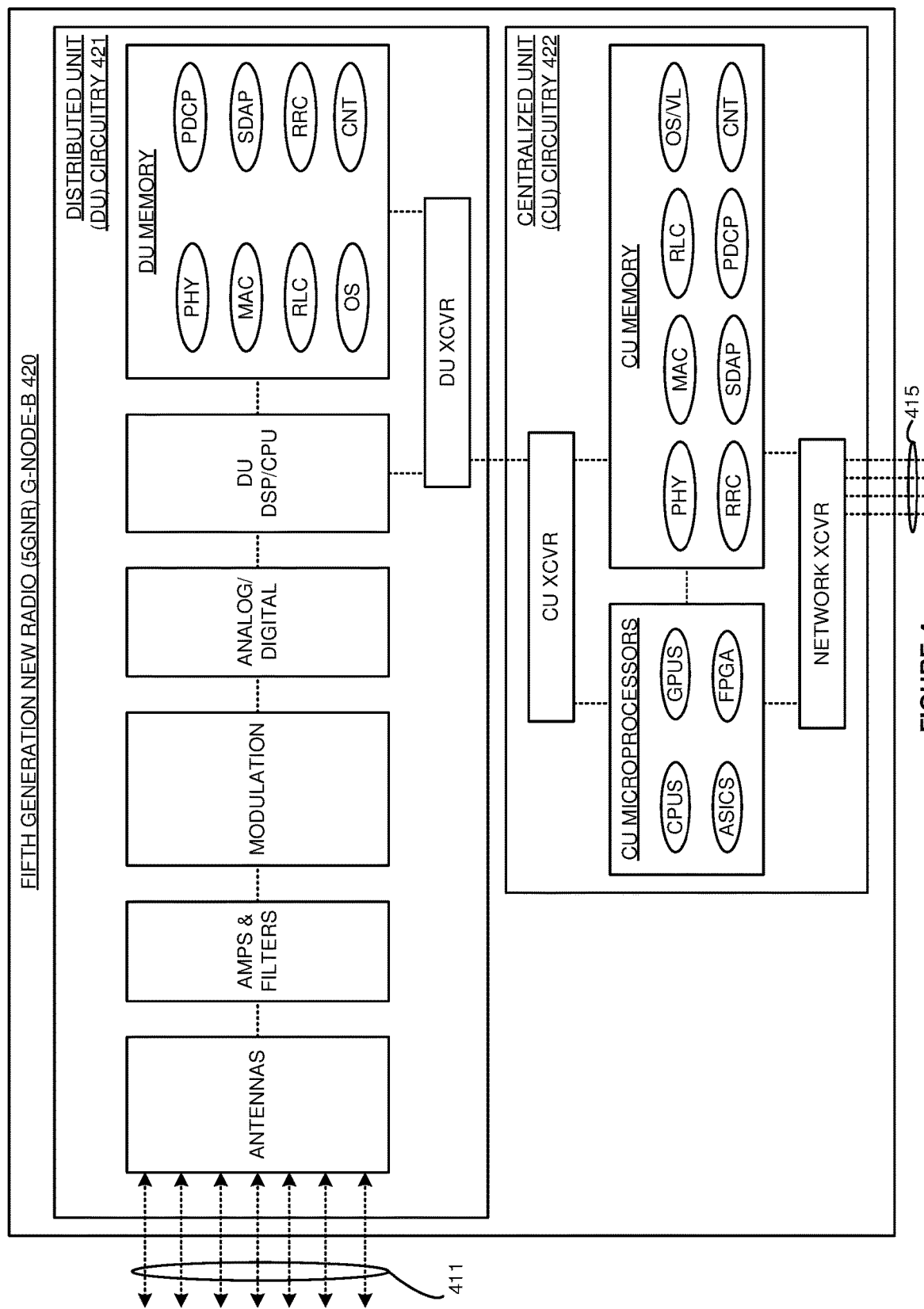
FIG. 4 illustrates a Fifth Generation New Radio (5GNR) gNodeB to serve 5GNR UEs with different 5GNR services using different 5GNR functionality splits.

FIG. 4 illustrates Fifth Generation New Radio (5GNR) gNodeB 420 to serve 5GNR UEs with different 5GNR services using different 5GNR functionality splits. 5GNR gNodeB 420 is an example of wireless access node 120, although node 120 may differ. 5GNR gNodeB 420 comprises 5GNR Distributed Unit (DU) circuitry 421 and Centralized Unit (CU) circuitry 422. DU circuitry 421 comprises antennas, amplifiers (AMPS), filters, modulation, analog-to-digital interfaces, Digital Signal Processors (DSP) and Central Processing Units (CPU), memory, and transceivers (XCVR) that are coupled over bus circuitry as depicted by the dotted lines. CU circuitry 432 comprises microprocessors, memory, and network transceivers that are coupled over bus circuitry as shown.

In 5GNR DU circuitry 421, the antennas are coupled to 5GNR UEs over wireless 5GNR links 411. The DU transceivers in 5GNR DU circuitry 421 are coupled to the CU transceivers in CU circuitry 422 over data links. The DU memory stores an operating system (OS) and network applications for 5GNR Physical Layer (PHY), 5GNR Media Access Control (MAC), 5GNR Radio Link Control (RLC), 5GNR Packet Data Convergence Protocol (PDCP), 5GNR Radio Resource Control (RRC), and 5GNR Service Data Adaptation Protocol (SDAP).

The network transceivers in CU circuitry 422 are coupled over data links 415 to AMFs, UPFs, and gNodeBs. The CU memory stores an operating system, virtual layer (VL) components, and network applications. The virtual layer components comprise hypervisor modules, virtual switches, virtual machines, and/or the like. The network applications comprise 5GNR PHY, 5GNR MAC, 5GNR RLC, 5GNR PDCP, 5GNR RRC, and 5GNR SDAP.

In DU circuitry 421, the antennas receive wireless signals from 5GNR UEs that transport RRC signaling and SDAP data. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSPs. The DSP recovers UL 5GNR symbols from the UL digital signals.

Per the selected functionality splits, the DU CPUs and/or the CU microprocessors execute sets of the 5GNR PHY, MAC, RLC, PDCP, RRC, and SDAP to process the UL 5GNR symbols and recover UL 5GNR RRC signaling and SDAP data. Per the selected functionality splits, the DU CPUs and/or the CU microprocessors execute sets of the 5GNR PHY, MAC, RLC, PDCP, RRC, and SDAP to process the UL 5GNR RRC signaling, X2 signaling, and Downlink (DL) N2 signaling to generate Downlink (DL) 5GNR RRC signaling, X2 signaling, UL N2 signaling. Per the selected functionality splits, the DU CPUs and/or the CU microprocessors execute sets of the 5GNR PHY, MAC, RLC, PDCP, RRC, and SDAP to process the UL 5GNR SDAP data to generate UL N3 data. The network transceiver transfers the X2 signaling, UL N2 signaling, and UL N3 data over data links 415.

Over data links 415, the network transceiver in CU circuitry 422 receives X2 signaling from other gNodeBs, N2 signaling from AMFs, and N3 data from UPFs. Per the selected functionality splits, the DU CPUs and/or the CU microprocessors execute sets of the 5GNR PHY, MAC, RLC, PDCP, RRC, and SDAP to process the DL N3 data to generate DL SDAP data. Per the selected functionality splits, the DU CPUs and/or the CU microprocessors execute sets of the 5GNR PHY, MAC, RLC, PDCP, RRC, and SDAP to process the DL 5GNR N2 signaling, X2 signaling, and UL 5GNR RRC signaling to generate UL 5GNR N2 signaling, X2 signaling, and DL 5GNR RRC signaling. Per the selected functionality splits, the DU CPUs and/or the CU microprocessors execute sets of the 5GNR PHY, MAC, RLC, PDCP, RRC, and SDAP to process the DL 5GNR RRC signaling and DL 5GNR SDAP data to generate DL 5GNR symbols.

In DU circuitry 421, the 5GNR DSP processes the DL 5GNR symbols to generate corresponding digital DL signals for the 5GNR analog-to-digital interfaces. The 5GNR analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL SDAP data and RRC signaling to the 5GNR UEs over 5GNR links 411.

The 5GNR SDAP maps between N3 data and SDAP data in Service Data Units (SDUs). The 5GNR RRC maps between N2 signaling and RRC signaling in SDUs. The 5GNR SDAP and RRC exchange their SDUs with the 5GNR PDCP. The 5GNR PDCP maps between the SDUs and PDUs. The PDCP exchanges the 5GNR PDUs with the 5GNR RLC. The 5GNR RLC maps between the PDUs and MAC logical channels. The 5GNR RLC exchanges the RRC signaling and SDAP data with the 5GNR MAC over the MAC logical channels. The 5GNR MAC maps between the MAC logical channels and MAC transport channels. The 5GNR MAC exchanges the 5GNR RRC signaling and SDAP data with the 5GNR PHY over the MAC transport channels. 5GNR PHY maps between the MAC transport channels and PHY transport channels. 5GNR PHY exchanges the 5GNR RRC signaling and SDAP data with the 5GNR PHYs in the 5GNR UEs over the PHY transport channels in wireless links 411.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In particular, DU circuitry 121 wirelessly receives service requests from the 5GNR UEs over 5GNR links 411 and transfers the service requests to CU circuitry 122. CU circuitry 122 receives the service requests and transfers the service requests to network controller 130 over data links 415. CU circuitry 422 receives service responses from network controller 130 indicating the individual function splits for the individual 5GNR UEs and transfers the service responses to DU circuitry 421. Different functionality splits may be used on the UL and DL for the same 5GNR UE at the same time. DU circuitry 421 wirelessly exchanges user communications with the 5GNR UEs over 5GNR links 411. DU circuitry 421 processes the user communications for the 5GNR UEs with the individual sets of PHY, MAC, RLC, PDCP, RRC, and SDAP per the individual functionality splits indicated in the service responses. DU circuitry 421 exchanges the user communications with CU circuitry 422. CU circuitry 422 processes the user communications with the individual sets of PHY, MAC, RLC, PDCP, RRC, and SDAP per the individual functionality splits indicated in the service responses. CU circuitry 422 exchanges the user communications with other gNodeBs, AMFs and UPFs over data links 415.

Figure 5:
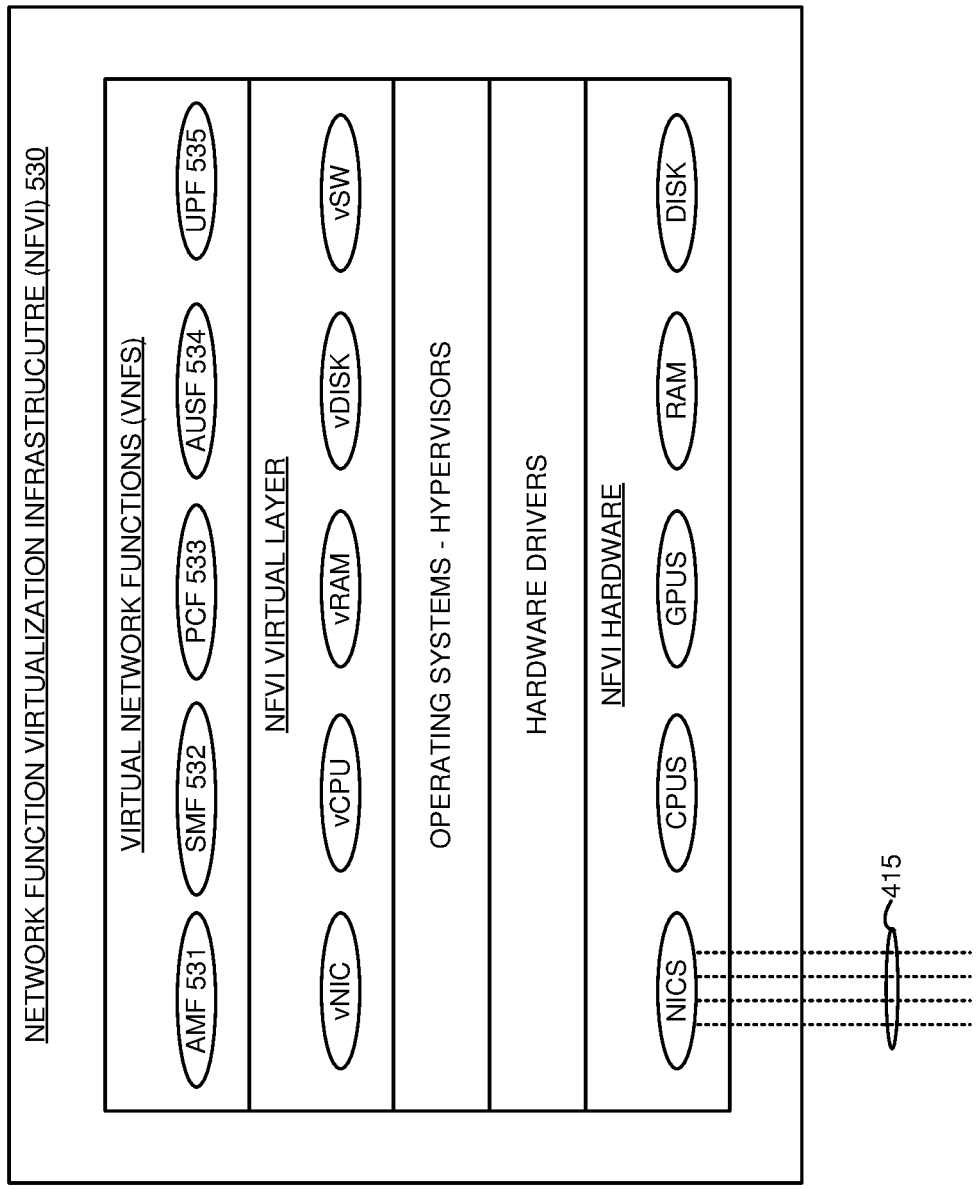
FIG. 5 illustrates a Network Function Virtualization Infrastructure (NFVI) to serve the 5GNR UEs with the different 5GNR services using the different 5GNR functionality splits in the gNodeB.

FIG. 5 illustrates Network Function Virtualization Infrastructure (NFVI) 530 to serve the 5GNR UEs with the different 5GNR services using the different 5GNR functionality splits. NFVI 530 is an example of network controller 130 and network element 131, although network controller 130 and network element 131 may differ. Network Function Virtualization Infrastructure (NFVI) 530 comprises NFVI hardware, hardware drivers, operating systems and hypervisors, NFVI virtual layer, and Virtual Network Functions (VNFs).

The NFVI hardware comprises Network Interface cards (NICs), CPUs, GPUs, RAM, and disk storage. The virtual layers comprise virtual NICs (vNIC), virtual CPUs (vCPU), virtual RAM (vRAM), virtual disk storage (vDISK), and virtual Switches (vSW). The VNFs comprise Access and Mobility Management Function (AMF) VNF 531, Session Management Function (SMF) VNF 532, Policy Control Function (PCF) VNF 533, Authentication and Security Function (AUSF) VNF 534, and User Plane Function (UPF) VNF 535. The NFVI hardware executes the hardware drivers, operating systems/hypervisors, virtual layers, and VNFs to serve the 5GNR UEs over the 5GNR gNodeBs.

In particular, AMF VNF 531 receives service requests for the 5GNR UEs over N2 signaling in data links 415 from the 5GNR gNodeBs. AMF VNF 531 transfers service request data to SMF VNF 532 and AUSF 534. SMF VNF 532 transfers service request data to PCF VNF 534. One or more VNFs 531-534 process the service request data to select individual function splits for the 5GNR UEs based on their individual wireless data service, QoS level, Public Land Mobile Network (PLMN), wireless network slice, UE-selected split, or some other information element in the service request. A data structure that correlates these information elements to specific function splits could be hosted and used to make the function split choices per UE per service. For example, AMF VNF 531 may select individual function splits for individual 5GNR UEs based on their wireless data service. SMF VNF 532 may select individual function splits for individual 5GNR UEs based on their PLMN. PCF VNF 533 may select individual function splits for individual 5GNR UEs based on their QoS levels. AUSF VNF 534 may select individual function splits for individual 5GNR UEs based on their wireless network slices. Different functionality splits may be used on the UL and DL for the same 5GNR UE at the same time. AMF VNF 531 transfers service responses to the 5GNR gNodeBs over N2 signaling in data links 415 that indicate the selected functionality splits for individual 5GNR UEs. SMF VNF 532 controls UPF VNF 535. UPF VNF 535 exchanges N3 data for the 5GNR UEs with the 5GNR gNodeBs. The 5GNR gNodeBs apply the selected functionality splits.

Figure 6:
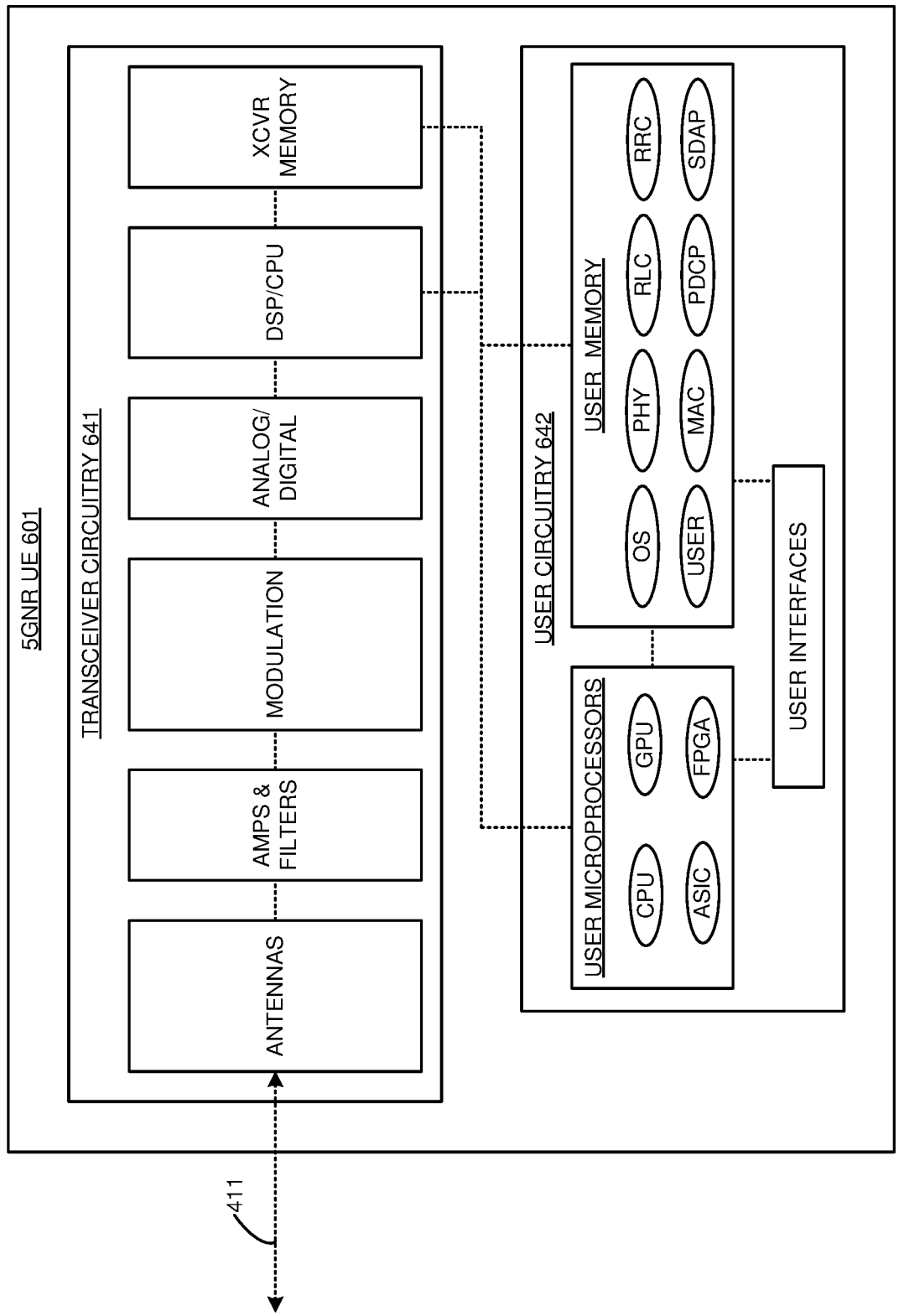
FIG. 6 illustrates a 5GNR UE that is served by the 5GNR gNodeB with the different 5GNR services using the different 5GNR functionality splits.

FIG. 6 illustrates 5GNR UE 601 that is served by 5GNR gNodeBs with different 5GNR services using the different 5GNR functionality splits. 5GNR UE 601 is an example of UEs 101-103, although UEs 101-103 may differ. 5GNR UE 601 comprises transceiver circuitry 641 and user circuitry 642 which are interconnected over bus circuitry. Transceiver circuitry 641 comprises antennas, amplifiers, filters, modulation, analog/digital interfaces, DSP, CPU, and memory. User circuitry 642 comprises user microprocessors, user memory, and user interfaces. The user interface comprises graphic displays, machine controllers, sensors, cameras, transceivers, and/or some other user components. The user microprocessors comprise CPUs, GPUs, ASICs, and/or some other computer circuitry. The user memory comprises volatile and non-volatile data storage like RAM, flash, and/or disk. The UE memory stores an operating system (OS), user applications (User), and 5GNR network applications. The 5GNR network applications comprise PHY, MAC, RLC, PDCP, RRC, and SDAP. The microprocessors execute the operating system, user applications, and 5GNR network applications to exchange SDAP data and RRC signaling with the 5GNR gNodeBs over 5GNR links including wireless link 411.

The user applications store UL user data and signaling in the user memory. The 5GNR network applications process the UL user data/signaling along with DL RRC signaling to generate UL RRC signaling. The network applications transfer UL SDAP data and the UL RRC signaling to the transceiver memory in transceiver circuitry 641. In transceiver circuitry 641, the DSP processes the UL SDAP data and RRC signaling to transfer corresponding digital UL signals to the analog-to-digital interfaces. The analog-to-digital interfaces convert the digital UL signals into analog UL signals for modulation. Modulation up-converts the analog UL signals to their carrier frequencies. The amplifiers boost the modulated UL signals for the filters which attenuate unwanted out-of-band energy. The filters transfer the UL signals through duplexers to the antennas. The electrical UL signals drive the antennas to emit corresponding wireless signals that transport the UL SDAP data and RRC signaling to the 5GNR gNodeBs.

In the transceiver circuitry 541, the antenna elements receive wireless 5GNR signals that transport SDAP data and RRC signaling from the 5GNR gNodeBs. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog-to-digital interfaces convert the analog DL signals into digital DL signals for the DSPs. The DSPs recover DL data from the digital DL signals. The DSPs transfer the DL data to the UE memory. The microprocessors execute the 5GNR network applications to process the DL data to recover the DL SDAP data and RRC signaling. The microprocessors execute the network applications to store the DL user data/signaling in the user memory. The user applications process their user data/signaling from the user memory and responsively drive the user interfaces.

Figure 7:
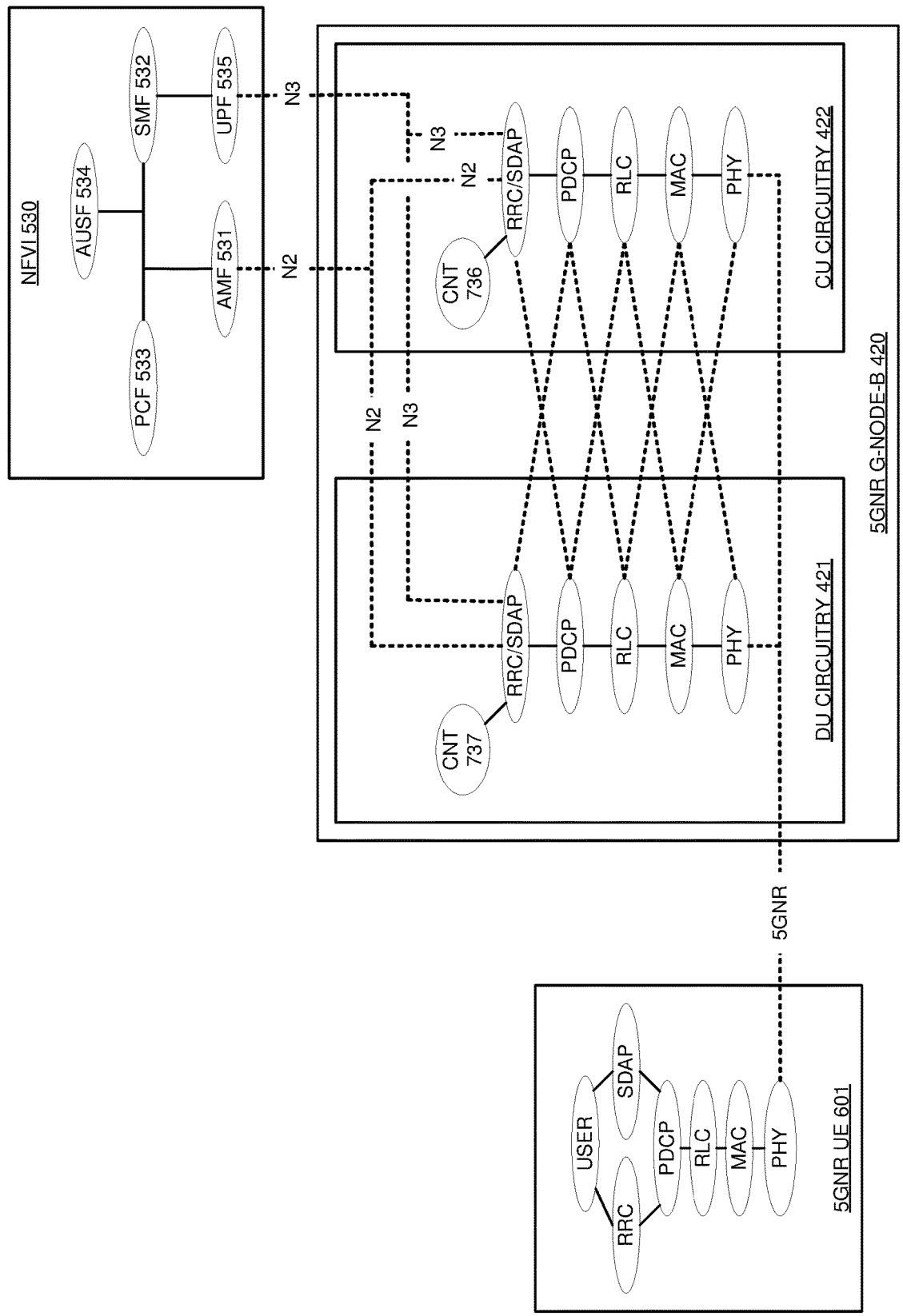
FIG. 7 illustrates the operation of the 5GNR UE, 5GNR gNodeB, and NFVI to serve the 5GNR UE with the different 5GNR services using the different 5GNR functionality splits.

FIG. 7 illustrates the operation of 5GNR gNodeB 420 and NFVI 530 to serve 5GNR UE 601 with 5GNR services using different 5GNR functionality splits. Initially, 5GNR gNodeB uses functionality split 3 as a default. The user application in 5GNR UE 601 transfers user data and signaling to the RRC in UE 601. The RRC in 5GNR UE 601 responsively transfers a corresponding service request to the RRC in CU circuitry 422 over: 1) the PDCP, RLC, MAC, and PHY in UE 601, 2) the PHY, MAC, and RLC in DU circuitry 421, and 3) the PDCP in CU circuitry 422. The RRC in CU circuitry 422 transfers the service request to AMF 531 over N2 signaling. AMF 531 transfers the service request to AUSF 534. AUSF 534 selects a wireless network slice for UE 601 based on a PLMN ID and a UE ID in the service request. PCF 533 selects a QoS level for UE 601 based on the UE ID and the selected wireless network slice. SMF 535 selects a functionality split that comprises an uplink split and a downlink split based on the selected QoS level and wireless network slice. AMF 531 transfers a service response indicating the selected functionality spit to the RRC in CU circuitry 422.

For the UL, the RRC in CU circuitry 422 configures the UL RRC in the functionality split (maybe itself) to serve UE 601. The UL RRC in the functionality split configures the UL SDAP in the functionality split to serve UE 601. The UL RRC and the UL SDAP in the functionality split configure the UL PDCP in the functionality split to serve UE 601. The UL PDCP in the functionality split configures the UL RLC in the functionality split to serve UE 601. The UL RLC in the functionality split configures the UL MAC in the functionality split to serve UE 601. The UL MAC in the functionality split configures the UL PHY in the functionality split to serve UE 601.

For the DL, the RRC in CU circuitry 422 configures the DL RRC in the functionality split (maybe itself) to serve UE 601. The DL RRC in the functionality split configures the DL SDAP in the functionality split to serve UE 601. The DL RRC and the DL SDAP in the functionality split configure the DL PDCP in the functionality split to serve UE 601. The DL PDCP in the functionality split configures the DL RLC in the functionality split to serve UE 601. The DL RLC in the functionality split configures the DL MAC in the functionality split to serve UE 601. The DL MAC in the functionality split configures the DL PHY in the functionality split to serve UE 601. The UL RRC in the functionality split configures the RRC in UE 601 to use the selected UL PHY. The DL RRC in the functionality split configures the RRC in UE 601 to use the selected DL PHY.

The RRC in UE 601 exchanges RRC signaling with DU circuitry 421 over the PDCP, RLC, MAC, and PHY in UE 601. The SDAP in UE 601 exchanges SDAP data with DU circuitry 421 over the PDCP, RLC, MAC, and PHY in UE 601. DU circuitry 121 processes the RRC signaling and SDAP data per the UL and DL functionality split. For example, DU circuitry 121 could apply a PHY and MAC to the DL for UE 601, but apply only the PHY to the UL for UE 601. In this example, CU circuitry 422 would apply the RLC, PDCP, and RRC/SDAP to the DL for UE 601 and apply the MAC, RLC, PDCP, and RRC/SDAP to the UL for UE 601. The RRCs in the selected functionality split exchange N2 signaling with AMF 531. The SDAPs in the selected functionality split exchange N3 data with UPF 535.

In alternative examples, some or all of the operations of NFVI 530 to select the functionality splits for the UEs based on the service requests could be integrated into CU circuitry 422 in the form of controller (CNT) 736. The RRC in CU circuitry 422 may transfer the service request to controller 736 for functionality split selection as described herein. Controller 736 could be integrated within the RRC in CU circuitry 422. Some or all of the operations of NFVI 530 to select the functionality splits for the UEs based on the service requests could be integrated into DU circuitry 421 in the form of controller 737. The RRC in DU circuitry 421 may transfer the service request to controller 737 for functionality split selection as described herein. Controller 737 could be integrated within the RRC in DU circuitry 421.

Figure 8:
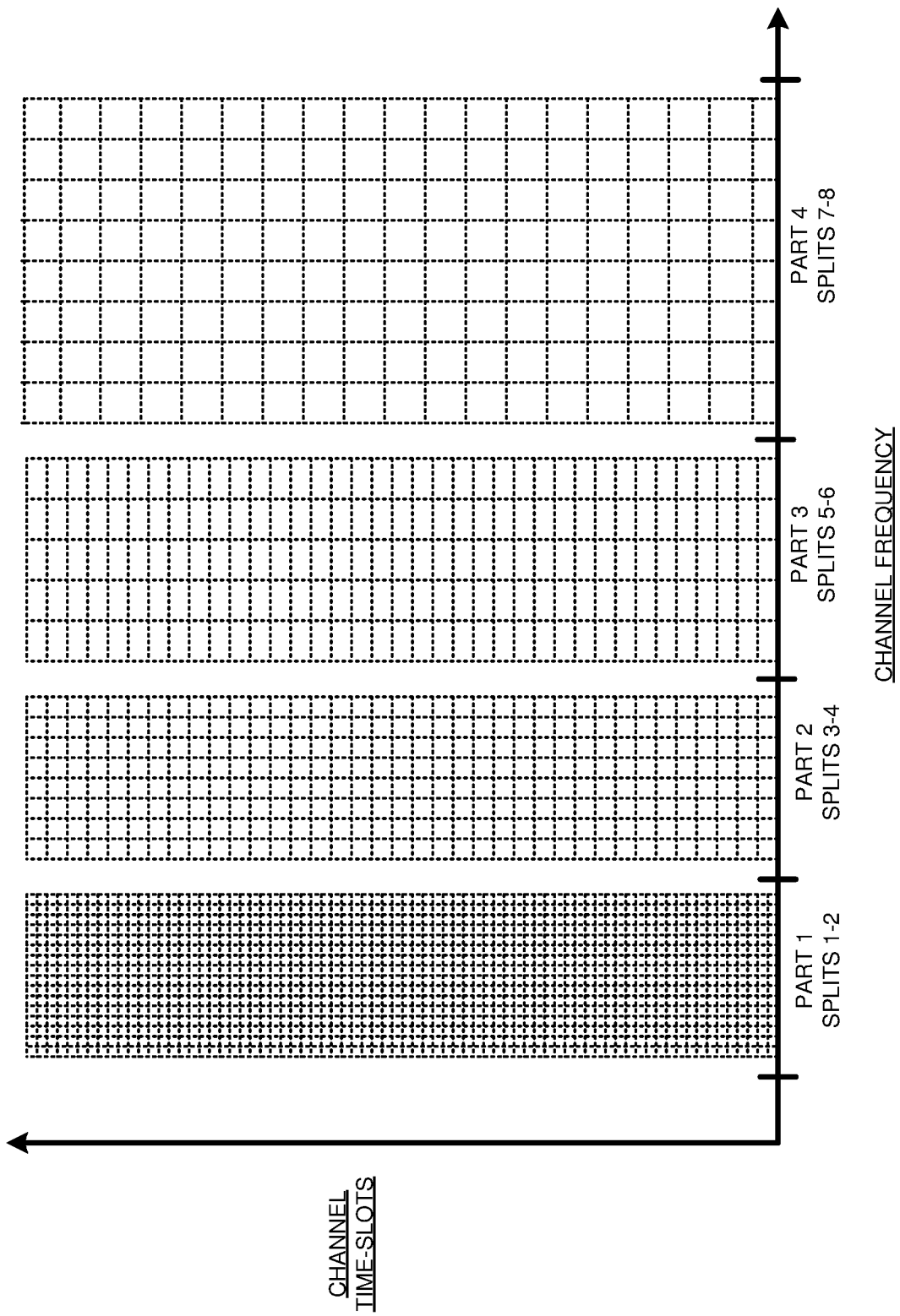
FIG. 8 illustrates an assignment of different functionality splits to different parts of a frequency channel.

FIG. 8 illustrates an assignment of different functionality splits to different parts of a frequency channel. The vertical axis represents Orthogonal Frequency Division Multiplexing (OFDM) time-slots. The horizontal axis represents OFDM frequencies that comprise an OFDM channel. For example, the OFDM channel may be 200 megahertz wide and be centered near 2 gigahertz. The frequency channel is separated into four parts, although a different number of parts could be used. Part 1 of the frequency channel supports functionality splits 1-2 which rely heavily on the DU to reduce latency. Part 2 of the frequency channel support functionality splits 3-4 which rely on more the DU than the CU to balance low-latency with some networking capability. Functionality split 3 is the default split for attaching or idle UEs. Part 3 of the frequency channel supports functionality splits 5-6 which rely more on the CU that the DU to improve networking capability. Part 4 of the frequency channel support functionality splits 7-8 which rely heavily on the CU to optimize networking capability.

The wireless access nodes described herein use the information depicted on FIG. 8 to select the parts of the frequency channel for the 5GNR UEs based on the selected functionality split for the UE. For example, a wireless access point would use part 2 of the frequency channel for a UE that is using functionality split 3 or 4. In another example, the wireless access point would use part 1 of the frequency channel for the UL when the UE is served by functionality split 1 or 2 on the UL, and the wireless access point would use part 4 of the frequency channel for the DL when the UE is served by functionality split 7 or 8 on the DL. Thus, the UE and wireless access node use the parts of the frequency channel that are assigned to their specific functionality split that is selected based on the service requests.

The wireless data network circuitry described above comprises computer hardware and software that form special-purpose wireless network circuitry to serve wireless UEs with different functionality splits in the wireless access nodes. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to serve wireless UEs with different functionality splits in the wireless access nodes.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UE) using functionality splits in Distributed Unit (DU) circuitry and Centralized Unit (CU) circuitry, the method comprising:
a wireless network controller selecting a network slice for the UE, identifying a wireless data service for the UE, selecting one of the functionality splits based on the selected network slice and the wireless data service, and indicating the selected functionality split to the CU circuitry;
the CU circuitry receiving the indication of the selected functionality split and indicating the selected functionality split to the DU circuitry;
the DU circuitry receiving the indication of the selected functionality split, exchanging user communications with the UE, processing the user communications with a set of network applications allocated to the DU circuitry in the selected functionality split, and exchanging the user communications with the CU circuitry, wherein the set of the network applications that are allocated to the DU circuitry comprises a set of Physical Layer (PHY), Media Access Control (MAC), Radio Link Control (RLC), Packet Data Convergence Protocol (PDCP), Radio Resource Control (RRC), and Service Data Adaptation Protocol (SDAP) that are not allocated to the CU circuitry in the selected functionality split; and
the CU circuitry exchanging the user communications with the DU circuitry and processing the user communications with a set of the network applications allocated to the CU circuitry in the selected functionality split, wherein the set of the network applications that are allocated to the CU circuitry comprises a set of the PHY, MAC, RLC, PDCP, RRC, and SDAP that are not allocated to the DU circuitry in the selected functionality split.

2. The method of claim 1 further comprising:
the wireless network controller selecting another network slice for the UE, selecting another one of the functionality splits based on the other selected network slice, and indicating the other selected functionality split to the CU circuitry;
the CU circuitry receiving the indication of the other selected functionality split and indicating the other selected functionality split to the DU circuitry;
the DU circuitry receiving the indication of the other selected functionality split, exchanging additional user communications with the UE, processing the additional user communications with a set of the network applications allocated to the DU circuitry in the other selected functionality split, and exchanging the additional user communications with the CU circuitry; and
the CU circuitry exchanging the additional user communications with the DU circuitry and processing the additional user communications with a set of the network applications allocated to the CU circuitry in the other selected functionality split.

3. The method of claim 1 further comprising:
the wireless network controller selecting another network slice for another UE, selecting another one of the functionality splits based on the other selected network slice, and indicating the other selected functionality split to the CU circuitry;
the CU circuitry receiving the indication of the other selected functionality split and indicating the other selected functionality split to the DU circuitry;
the DU circuitry receiving the indication of the other selected functionality split, exchanging other user communications with the other UE, processing the other user communications with a set of the network applications allocated to the DU circuitry in the other selected functionality split, and exchanging the other user communications with the CU circuitry; and
the CU circuitry exchanging the other user communications with the DU circuitry and processing the other user communications with a set of the network applications allocated to the CU circuitry in the other selected functionality split.

4. The method of claim 1 further comprising:
the DU circuitry receiving a service request from the UE indicating the network slice and transferring the service request indicating the network slice to the CU circuitry; and
the CU circuitry receiving the service request indicating the network slice and transferring the service request indicating the network slice to the wireless network controller.

5. The method of claim 1 wherein:
the wireless data service comprises a low-latency data communications service; and the wireless network controller selecting one of the functionality splits based on the selected network slice and the wireless data service comprises identifying the low-latency data communications service for the UE and selecting the one of the functionality splits based on the selected network slice and the low-latency data communications service.

6. The method of claim 1 wherein the wireless network controller selecting one of the functionality splits based on the selected network slice and the wireless data service comprises identifying a Quality-of-Service (QoS) level for the UE and selecting the one of the functionality splits based on the selected network slice, the wireless data service, and the QoS level.

7. The method of claim 1 wherein the wireless network controller selecting one of the functionality splits based on the selected network slice and the wireless data service comprises identifying a Public Land Mobile Network Identifier (PLMN ID) for the UE and selecting the one of the functionality splits based on the selected network slice, the wireless data service, and the PLMN ID.

8. The method of claim 1 wherein the wireless network controller comprises at least one of a Fifth Generation Core (5GC) Session Management Function (SMF) or a 5GC Policy Control Function (PCF).

9. The method of claim 1 wherein the DU circuitry comprises Fifth Generation New Radio (5GNR) DU circuitry and the CU circuitry comprises 5GNR CU circuitry.

10. A wireless communication network to serve User Equipment (UE) using functionality splits in Distributed Unit (DU) circuitry and Centralized Unit (CU) circuitry, the wireless communication network comprising:
a wireless network controller configured to select a network slice for the UE, identify a wireless data service for the UE, select one of the functionality splits based on the selected network slice and the wireless data service, and indicate the selected functionality split to the CU circuitry;
the CU circuitry configured to receive the indication of the selected functionality split and indicate the selected functionality split to the DU circuitry;
the DU circuitry configured to receive the indication of the selected functionality split, exchange user communications with the UE, process the user communications with a set of network applications allocated to the DU circuitry in the selected functionality split, and exchange the user communications with the CU circuitry, wherein the set of the network applications that are allocated to the DU circuitry comprises a set of Physical Layer (PHY), Media Access Control (MAC), Radio Link Control (RLC), Packet Data Convergence Protocol (PDCP), Radio Resource Control (RRC), and Service Data Adaptation Protocol (SDAP) that are not allocated to the CU circuitry in the selected functionality split; and
the CU circuitry configured to exchange the user communications with the DU circuitry and process the user communications with a set of the network applications allocated to the CU circuitry in the selected functionality split, wherein the set of the network applications that are allocated to the CU circuitry comprises a set of the PHY, MAC, RLC, PDCP, RRC, and SDAP that are not allocated to the DU circuitry in the selected functionality split.

11. The wireless communication network of claim 10 further comprising:

the wireless network controller configured to select another network slice for the UE, select another one of the functionality splits based on the other selected network slice, and indicate the other selected functionality split to the CU circuitry;
the CU circuitry configured to receive the indication of the other selected functionality split and indicate the other selected functionality split to the DU circuitry;
the DU circuitry configured to receive the indication of the other selected functionality split, exchange additional user communications with the UE, process the additional user communications with a set of the network applications allocated to the DU circuitry in the other selected functionality split, and exchange the additional user communications with the CU circuitry; and
the CU circuitry configured to exchange the additional user communications with the DU circuitry and process the additional user communications with a set of the network applications allocated to the CU circuitry in the other selected functionality split.

12. The wireless communication network of claim 10 further comprising:
the wireless network controller configured to select another network slice for another UE, select another one of the functionality splits based on the other selected network slice, and indicate the other selected functionality split to the CU circuitry;
the CU circuitry configured to receive the indication of the other selected functionality split and indicate the other selected functionality split to the DU circuitry;
the DU circuitry configured to receive the indication of the other selected functionality split, exchange other user communications with the other UE, process the other user communications with a set of the network applications allocated to the DU circuitry in the other selected functionality split, and exchange the other user communications with the CU circuitry; and
the CU circuitry configured to exchange the other user communications with the DU circuitry and process the other user communications with a set of the network applications allocated to the CU circuitry in the other selected functionality split.

13. The wireless communication network of claim 10 further comprising:
the DU circuitry configured to receive a service request from the UE indicating the network slice and transfer the service request indicating the network slice to the CU circuitry; and
the CU circuitry configured to receive the service request indicating the network slice and transfer the service request indicating the network slice to the wireless network controller.

14. The wireless communication network of claim 10 wherein:
the wireless data service comprises a low-latency communication service; and
the wireless network controller is configured to identify the low-latency communication service for the UE and select the one of the functionality splits based on the selected network slice and the low-latency communication service.

15. The wireless communication network of claim 10 wherein the wireless network controller is configured to identify a Quality-of-Service (QoS) level for the UE and select the one of the functionality splits based on the selected network slice, the wireless data service, and the QoS level.

16. The wireless communication network of claim 10 wherein the wireless network controller is configured to identify a Public Land Mobile Network Identifier (PLMN ID) for the UE and select the one of the functionality splits based on the selected network slice, the wireless data service, and the PLMN ID.

17. The wireless communication network of claim 10 wherein the wireless network controller comprises a Fifth Generation Core (5GC) Session Management Function (SMF).

18. The wireless communication network of claim 10 wherein the wireless network controller comprises a Fifth Generation Core (5GC) Policy Control Function (PCF).

19. The wireless communication network of claim 10 wherein the DU circuitry comprises Fifth Generation New Radio (5GNR) DU circuitry and the CU circuitry comprises 5GNR CU circuitry.

20. A method of operating a wireless communication network to serve User Equipment (UE) using functionality splits in a Distributed Unit (DU) and a Centralized Unit (CU), the method comprising:

a wireless network controller selecting a network slice for the UE, identifying a wireless data service for the UE, selecting one of the functionality splits based on the selected network slice and the wireless data service, and indicating the selected functionality split to the CU;

the CU receiving the indication of the selected functionality split and indicating the selected functionality split to the DU;

the DU receiving the indication of the selected functionality split, exchanging user communications with the UE, processing the user communications with a set of network applications allocated to the DU in the selected functionality split, and exchanging the user communications with the CU, wherein the set of the network applications that are allocated to the DU in the selected functionality split comprises a set of Physical Layer (PHY), Media Access Control (MAC), Radio Link Control (RLC), Packet Data Convergence Protocol (PDCP), Radio Resource Control (RRC), and Service Data Adaptation Protocol (SDAP) that are not allocated to the CU in the selected functionality split; and the CU exchanging the user communications with the DU and processing the user communications with a set of the network applications allocated to the CU in the selected functionality split, wherein the set of the network applications that are allocated to the CU in the selected functionality split comprises a set of the PHY, MAC, RLC, PDCP, RRC, and SDAP that are not allocated to the DU in the selected functionality split.

\* \* \* \* \*